(12) United States Patent
Shimizu

(10) Patent No.: US 11,155,272 B2
(45) Date of Patent: Oct. 26, 2021

(54) ESTIMATING APPARATUS

(71) Applicant: DENSO CORPORATION, Kariya (JP)

(72) Inventor: Naotsugu Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/998,908

(22) PCT Filed: Feb. 17, 2017

(86) PCT No.: PCT/JP2017/005970
§ 371 (c)(1),
(2) Date: Aug. 16, 2018

(87) PCT Pub. No.: WO2017/142075
PCT Pub. Date: Aug. 24, 2017

(65) Prior Publication Data
US 2019/0375418 A1    Dec. 12, 2019

(30) Foreign Application Priority Data
Feb. 17, 2016 (JP) .............................. JP2016-028242

(51) Int. Cl.
*B60W 40/114* (2012.01)
*B60W 40/06* (2012.01)
*G05D 1/02* (2020.01)
*G08G 1/16* (2006.01)

(52) U.S. Cl.
CPC .......... *B60W 40/114* (2013.01); *B60W 40/06* (2013.01); *G05D 1/0212* (2013.01); *B60W 2520/06* (2013.01); *B60W 2520/14* (2013.01); *B60W 2554/80* (2020.02); *G05D 2201/0213* (2013.01)

(58) Field of Classification Search
USPC .......................................................... 701/45
See application file for complete search history.

(56) References Cited

U.S. PATENT DOCUMENTS

| 5,572,428 A | 11/1996 | Ishida et al. |
| 2004/0143416 A1* | 7/2004 | Hattori .................... B60T 8/172 |
| | | 702/157 |
| 2005/0102085 A1* | 5/2005 | Sakata .................. B60W 40/10 |
| | | 701/72 |

(Continued)

FOREIGN PATENT DOCUMENTS

| JP | H07-104062 | 4/1995 |
| JP | 2007/516906 | 6/2007 |

(Continued)

*Primary Examiner* — Tyler D Paige
(74) *Attorney, Agent, or Firm* — Maschoff Brennan

(57) ABSTRACT

An odometry acquiring unit acquires odometry information including a yaw rate applied to a vehicle and a steering angle of the vehicle. An estimate calculating unit calculates an estimate of a turning radius based on the steering angle and the yaw rate acquired by the odometry acquiring unit. A change rate calculating unit calculates a yaw change rate representing a degree of change in the yaw rate acquired by the odometry acquiring unit. A contribution adjusting unit makes an adjustment of decreasing a contribution of the yaw rate and increasing a contribution of the steering angle, to calculation of an estimate performed by the estimate calculating unit, as the yaw change rate increases.

14 Claims, 10 Drawing Sheets

(56) References Cited

U.S. PATENT DOCUMENTS

| | | | | |
|---|---|---|---|---|
| 2006/0015239 | A1* | 1/2006 | Higuchi | B60T 7/12 |
| | | | | 701/72 |
| 2010/0292904 | A1* | 11/2010 | Taguchi | B60W 30/143 |
| | | | | 701/93 |
| 2015/0332100 | A1* | 11/2015 | Yamaguchi | G06T 7/75 |
| | | | | 348/142 |
| 2017/0345312 | A1* | 11/2017 | Shimizu | B60R 21/00 |
| 2018/0178721 | A1* | 6/2018 | Ikedo | B60W 50/14 |
| 2018/0297594 | A1* | 10/2018 | Takahashi | G05D 1/0246 |
| 2019/0375418 | A1* | 12/2019 | Shimizu | G08G 1/16 |
| 2020/0031341 | A1* | 1/2020 | Kitamura | G06K 9/00825 |

FOREIGN PATENT DOCUMENTS

| | | |
|---|---|---|
| JP | 2009/227196 | 10/2009 |
| JP | 2014/151853 | 8/2014 |

* cited by examiner

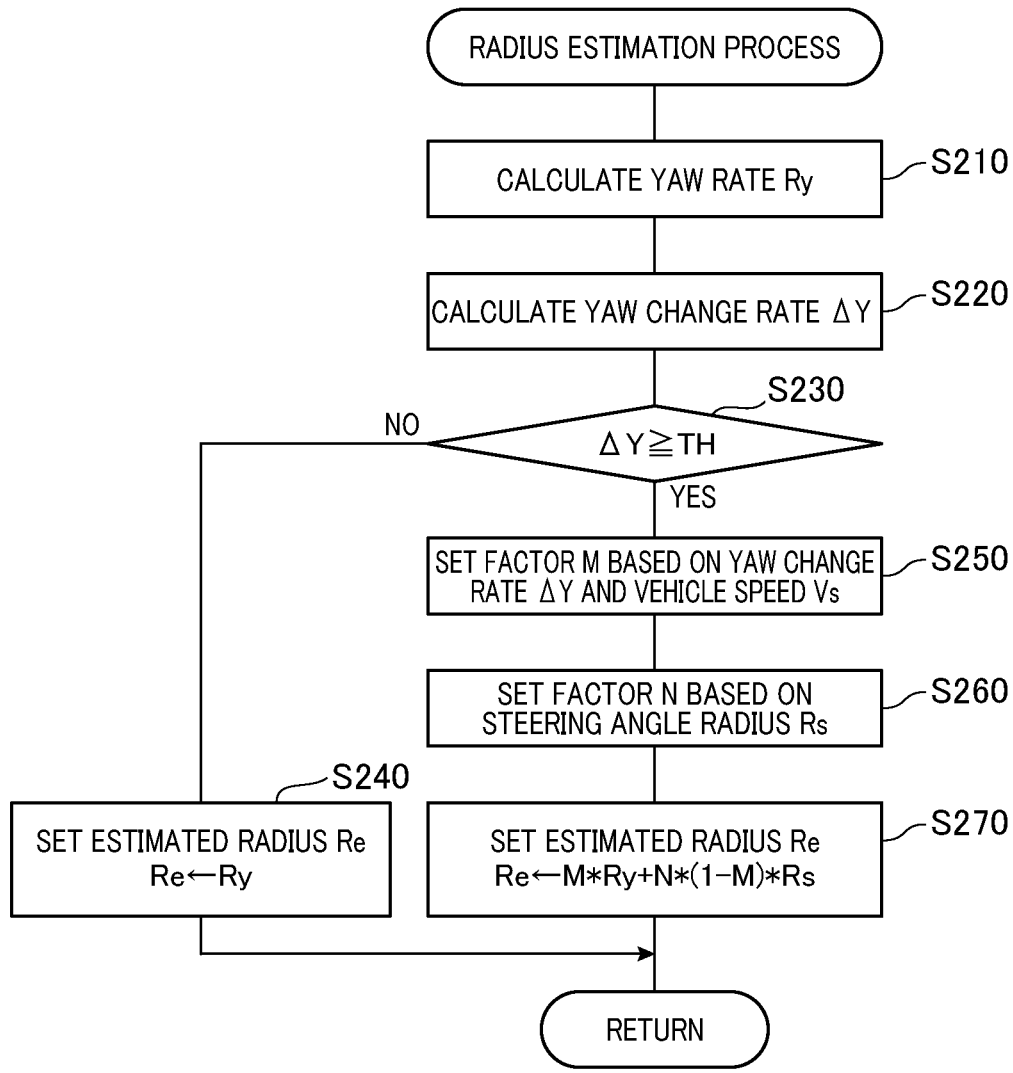

ESTIMATING APPARATUS

CROSS REFERENCE TO RELATED APPLICATION

This application is the U.S. national phase of International Application No. PCT/JP2017/005970 filed Feb. 17, 2017 which designated the U.S. and claims priority to Japanese Patent Application No. 2016-28242 filed Feb. 17, 2016, the entire contents of which are hereby incorporated by reference.

TECHNICAL FIELD

The present disclosure relates to a technique for estimating a turning radius of a vehicle from odometry information.

BACKGROUND ART

A technique that a position or a travel trajectory with respect to a traveling path of an own vehicle is estimated using odometry information of the own vehicle such as a vehicle speed, a yaw angle, and a steering angle without using an external observation sensor such as a GPS apparatus or a camera is known.

The travel trajectory estimation involves use of a turning radius which is one of necessary pieces of information for the estimation. The turning radius can be calculated based on detections derived from a yaw rate sensor or a steering angle sensor. Of these sensors, the yaw rate sensor has good accuracy but is poor in responsiveness and unstable in an output at low speed. The steering angle sensor has good responsiveness but may provide detection results including errors. The errors in this case are attributed to the steering angle not necessarily precisely agreeing with the actual traveling direction due to tire skid or the like.

In this regard, PTL 1 proposes a technique of using outputs through switching between the yaw rate sensor and the steering angle sensor, depending on the vehicle speed, so that the output of the yaw rate sensor is used at high speed traveling and that of the steering sensor is used at low speed traveling.

CITATION LIST

Patent Literature

PTL 1: JP 2007-516906 A

SUMMARY OF THE INVENTION

It has been found that travel trajectory estimation may include an error of disagreeing from the actual trajectory in the event that the yaw rate changes abruptly as a result of thorough study conducted by the inventor. Such an abrupt change of the yaw rate is caused by the steering wheel being operated, for example, during estimation of a travel trajectory based on the turning radius calculated from the output of the yaw rate sensor. This error is attributed to the delay in the change of the sensor output in response to the operation of the steering wheel. The abrupt change in the yaw rate may occur not only due to steering wheel operation but also due to sudden braking, uneven road surfaces, or the like during straight traveling.

The present disclosure provides a technique of achieving accurate travel trajectory estimation based on odometry information in any situation.

An estimating apparatus according to an aspect of the present disclosure includes an odometry acquiring unit, an estimate calculating unit, a change rate calculating unit, and a contribution adjusting unit. The odometry acquiring unit is configured to acquire odometry information including a yaw rate applied to an own vehicle and a steering angle of the own vehicle. The estimate calculating unit is configured to determine an estimate of a turning radius based on the steering angle and the yaw rate acquired by the odometry acquiring unit. The change rate calculating unit is configured to determine a yaw rate representing a degree of change in the yaw rate acquired by the odometry acquiring unit. The contribution adjusting unit is configured to make an adjustment of decreasing a contribution of the yaw rate and increasing a contribution of the steering angle, to calculation of an estimate performed by the estimate calculating unit, as the yaw rate increases.

According to such a configuration, the estimate of the turning radius is calculated mainly based on the yaw rate having good detection accuracy if the yaw rate is low, and mainly based on the steering angle of good responsiveness if the yaw rate is high. Therefore, accumulation of errors included in the steering angle can be minimized on a straight road or the like having a low yaw rate, and occurrence of errors based on the yaw rate of poor responsiveness can be minimized on a curved road or the like having a high yaw rate. As a result, an accurate estimate of a turning radius can be obtained in any situation regardless of the yaw rate, and an accurate travel trajectory can further be calculated from the estimate of the turning radius.

BRIEF DESCRIPTION OF THE DRAWINGS

FIG. 3 is a flow chart illustrating a radius estimation process;

FIG. 4 is a diagram illustrating an adjustment factor map;

DESCRIPTION OF THE EMBODIMENT

An embodiment will be described with reference to the drawings according to the present invention.

1. Configuration

Figure 1:
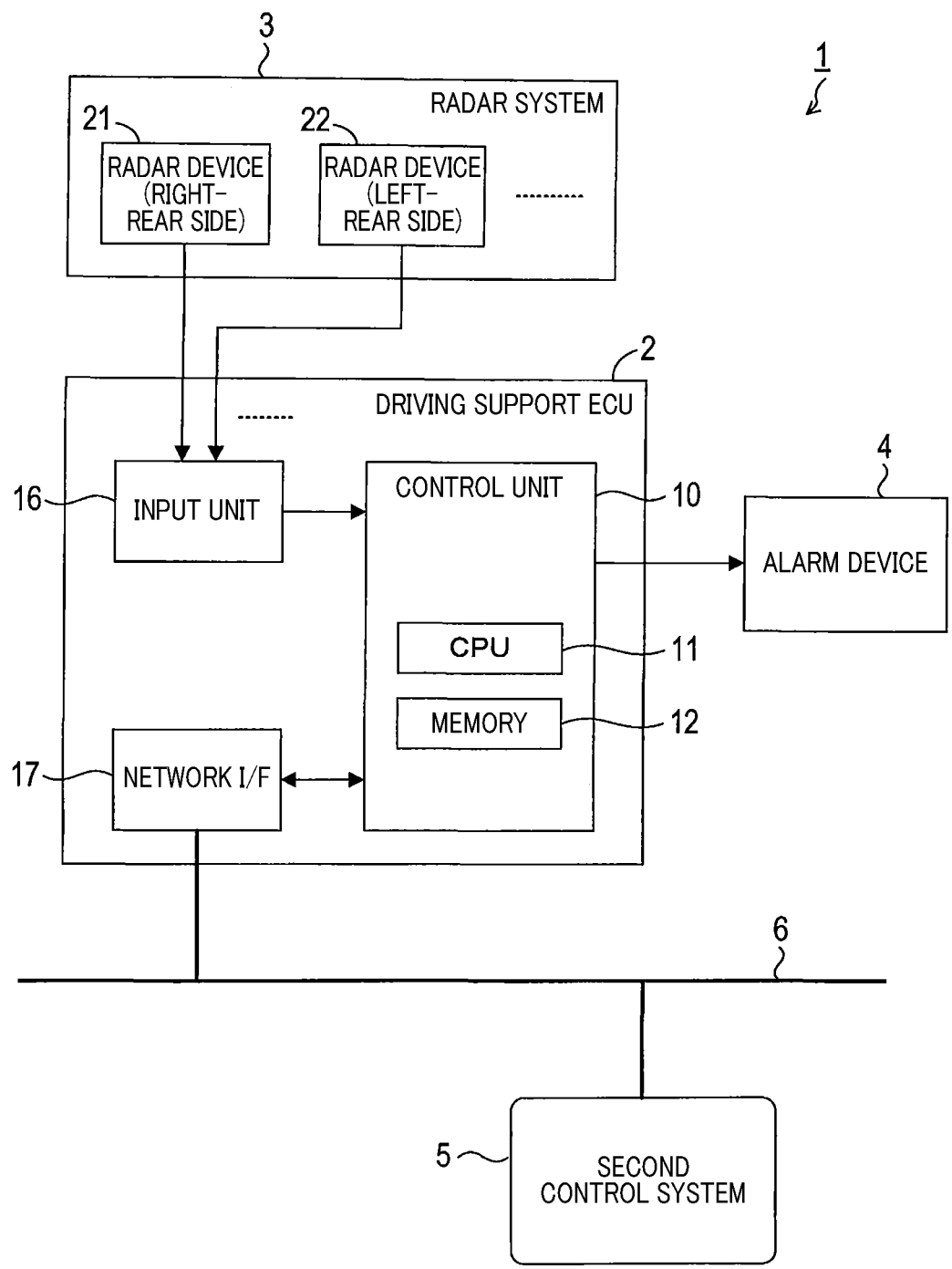
FIG. 1 is a block diagram illustrating a configuration of an on-vehicle system 1 according to an embodiment.

FIG. 1 shows an on-vehicle system 1 of the present embodiment which includes a driving support ECU 2, a radar system 3, an alarm device 4, and another control system 5. In the present embodiment, the on-vehicle system 1 is mounted to a vehicle that is a four-wheeled vehicle. The vehicle equipped with the on-vehicle system 1 is hereinafter also referred to as an own vehicle.

The radar system 3 includes a plurality of radar devices 21, 22, . . . . As the plurality of radar devices, the present embodiment at least includes a right-rear radar device 21 provided to a right-rear surface of the vehicle and a left-rear radar device 22 provided to a left-rear surface of the vehicle. The right-rear radar device 21 acquires information on objects present on the right side and the right-rear side of the vehicle. The left-rear radar device 22 acquires information on objects present on the left side and the left-rear side of the vehicle. If use of only one of the plurality of radar devices enables acquisition of the information on all the targets behind the vehicle, including the information on predetermined areas on the right-rear and left-rear sides of the vehicle, the one radar device in question may be used instead of the two radar devices 21 and 22.

The plurality of radar devices 21, 22, . . . constituting the radar system 3 all have basically the same configuration and functions. Therefore, the following description is focused on the right-rear radar device 21 as a representative.

The right-rear radar device 21 transmits radar waves and receives reflected radar waves. Based on a received signal, the right-rear radar device 21 calculates target information on the target that is the object reflected the radar waves. The right-rear radar device 21 inputs the target information into the driving support ECU 2. The target information calculated by the right-rear radar device 21 includes a distance D from the own vehicle to the target, a relative speed Vr of the target relative to the own vehicle, and an azimuth θ of the target with reference to the own vehicle. In other words, the target information is expressed with reference to the own vehicle.

Note that various detection systems are known as a target detection system used for the radar device including an FMCW system, and a dual-frequency CW system. As an example, the right-rear radar device 21 of the present embodiment is configured as a so-called a millimeter-wave radar which is based on the FMCW system. However, since the target detection method used in the FMCW-based millimeter-wave radars is well known, detailed description is omitted below.

The other control system 5 encompasses a plurality of on-vehicle devices (e.g., ECUs and sensors) other than the driving support ECU 2.

The driving support ECU 2 is connected to the other control system 5 via a network 6 so as to enable mutual communication. The network 6 of the present embodiment is CAN which is known as an on-vehicle network.

Various pieces of odometry information are periodically transmitted to the network 6 from the other control system 5. The driving support ECU 2 acquires the odometry information via the network 6. The acquired odometry information includes a speed of the vehicle (hereinafter referred to as a vehicle speed) Vs, a yaw rate ω of the vehicle, a steering angle α of the vehicle, a turning radius Rs of the vehicle.

These pieces of odometry information are periodically transmitted to the network 6. Specifically, the other control system 5 calculates the vehicle speed Vs, the yaw rate co, and the steering angle α based on detection signals from a vehicle speed sensor, a yaw rate sensor, and a steering angle sensor, which are not shown. The other control system 5 further calculates the turning radius Rs using a predetermined calculation method that is based on the steering angle α and transmits the results of the calculations. The turning radius Rs calculated from the steering angle α is hereinafter referred to as a steering angle radius. Various methods can be mentioned for calculating the steering angle radius Rs. Examples of the methods that can be used for the calculation include a method that uses a table containing correlation between the steering angle α and the turning radius R, and a method of using a predetermined formula for application of these data. The driving support ECU 2 may internally calculate the steering angle radius Rs based on the steering angle α acquired via the network 6, instead of acquiring the steering angle radius Rs via the network 6.

The driving support ECU 2 includes a control unit 10, an input unit 16, and a network interface (hereinafter referred to as a network I/F) 17. The input unit 16 outputs target information, which is received from the radar devices 21, 22, . . . constituting the radar system 3, to the control unit 10. The network I/F 17 is a communication I/F provided to allow the control unit 10 to perform data communication with the other control system 5 via the network 6.

The control unit 10 executes various processes based on the pieces of target information D, Vr and θ received via the input unit 16 from the radar devices 21, 22, . . . constituting the radar system 3. These processes are performed for each of the radar devices 21, 22, . . . .

Further, the control unit 10 has a vehicle detecting function and a lane monitoring function. The vehicle detecting function is a well-known function of detecting other vehicles present in a predetermined monitoring area based on target information received from the radar system 3. The lane monitoring function is used for determining whether another vehicle is traveling in a lane adjacent to the traveling lane of the own vehicle, and, if the other vehicle is traveling in the adjacent lane and a traveling state of the vehicle satisfies a specific condition, the alarm device 4 is activated to output an alarm. The lane monitoring function is implemented using the odometry information acquired from the other control system 5 via the network 6, the target information acquired from the radar system 3, and the like. The target information used is mainly acquired from the right- and left-rear radar devices 21 and 22.

The control unit 10 mainly includes a well-known microcomputer having a CPU 11 and a semiconductor memory such as a RAM, a ROM, or a flash memory (hereinafter referred to as a memory 12). Besides programs used for implementing various functions, the memory 12 stores at least an adjustment factor map used for determining an adjustment factor M described later, and a correction factor map used for determining a correction factor N.

The various functions of the control unit 10 are implemented by the CPU 11 executing programs stored in a non-transitory tangible recording medium. In the present example, the memory 12 corresponds to a non-transitory tangible recording medium in which programs are stored. When the programs are executed, methods corresponding to the programs are executed. Note that the control unit 10 may include one or more microcomputers. The method of implementing the functions of the control unit 10 is not limited to use of software. Some or all of the elements of the functions may be implemented using hardware that is a combination of a logic circuit, an analog circuit, and the like.

2. Processing

[2-1. Lane Monitoring Process]

Figure 2:
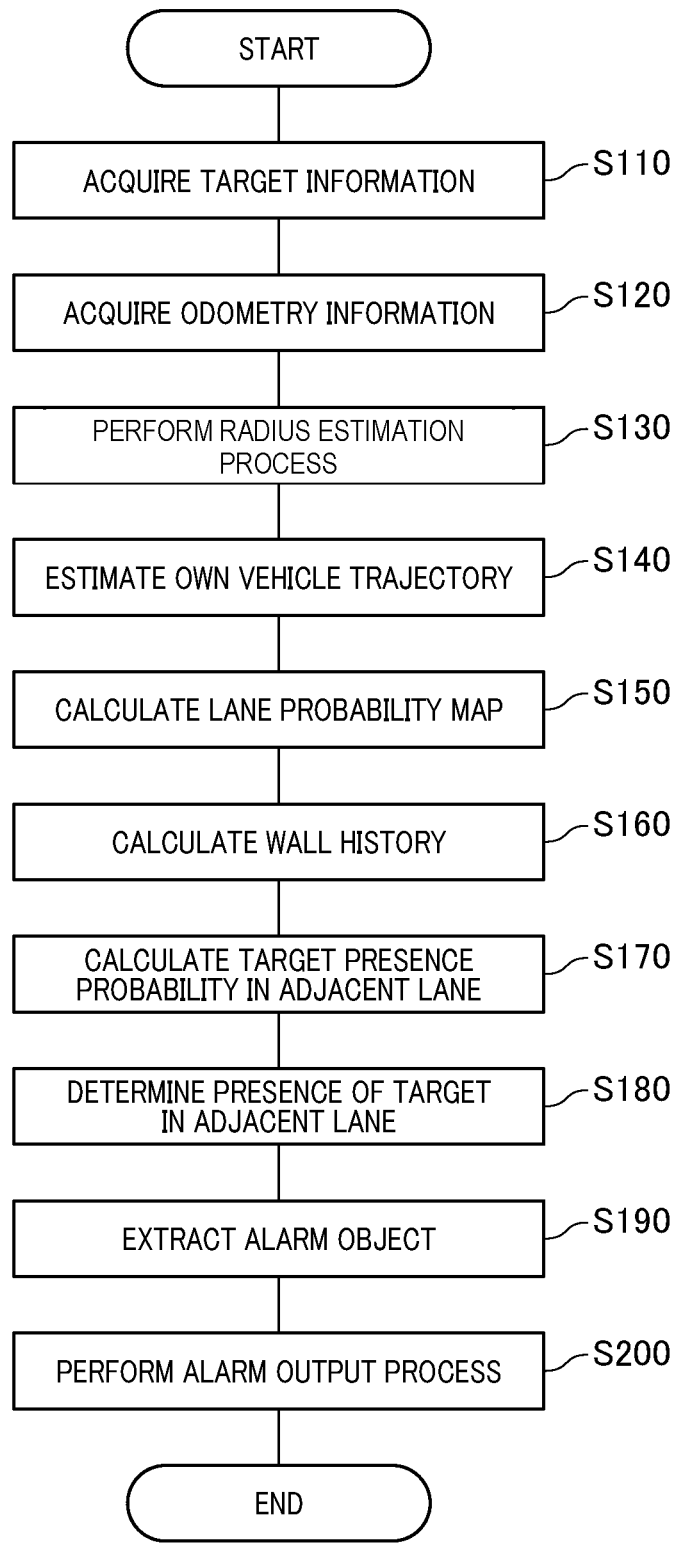
FIG. 2 is a flow chart illustrating a lane monitoring process.

Referring to FIG. 2, an outline of a lane monitoring process executed by the control unit 10 will be described. Note that the control unit 10 actually monitors the adjacent lanes on the left and right sides of the own vehicle. For clarity, the following description is provided taking the adjacent lane on the right side of the vehicle as being a monitoring target. Therefore, the following lane monitoring process performed for the right side of the own vehicle is applied to the left side of the own vehicle.

When activated, the CPU 11 of the control unit 10 reads the program for the lane monitoring process from the memory 12 and repeatedly executes the program at a control cycle T. Upon start of the present process, the CPU 11 of the control unit 10 acquires, at S110, target information from the right-rear radar device 21 via the input unit 16. The target information acquired at this step includes information on other vehicles and information on walls, i.e. targets. The wall refers to a stationary target corresponding to a wall that is present on the right side of the own vehicle. By acquiring target information of a wall, the CPU 11 calculates a direction and a distance W of the wall relative to the own vehicle at every control cycle T.

At S120, the CPU 11 acquires the odometry information from the other control system 5 via the network 6. The odometry information acquired in this case includes, as mentioned above, at least the vehicle speed Vs, the yaw rate ω, the steering angle α, and the steering angle radius Rs.

At S130, the CPU 11 uses the odometry information acquired at S120 to execute a radius estimation process for calculating an estimated radius Re that is an estimated turning radius of the own vehicle. Details of the radius estimation process will be described later.

At S140, the CPU 11 uses the odometry information acquired at S120 and the estimated radius Re calculated at S130 to estimate an own vehicle trajectory that is a travel trajectory of the own vehicle. Specifically, the CPU 11 calculates the own vehicle estimated positions at respective control time points that have occurred in the N preceding cycles, with reference to the current position of the own vehicle. Then, the CPU 11 estimates an own vehicle trajectory by sequentially joining by lines the own vehicle estimated positions in these cycles starting from the current position. Such a technique of estimating an own vehicle trajectory from the odometry information including a turning radius is well known and thus the details are omitted.

In addition, at S140, the CPU 11 also calculates an estimated presence range of the own vehicle estimated positions in these cycles, taking possible errors included in the odometry information into account. The possible errors included in the odometry information are attributed, for example, to detection errors of the sensors used for detecting pieces of odometry information, or noise superimposed on the detection results. Furthermore, the estimated presence range can be expressed as an error variance with reference to the own vehicle estimated position. The estimated presence range herein is modeled based on normal distribution (i.e. Gaussian distribution). Specifically, the presence probability of the own vehicle estimated position is expressed in terms of a peak where the probability is the highest in the normal distribution. With the increase of distance from the own vehicle estimated position, the presence probability decreases according to the normal distribution. The estimated presence ranges obtained based on earlier control time points result in larger error variances accordingly with flatter peaks.

Figure 8:
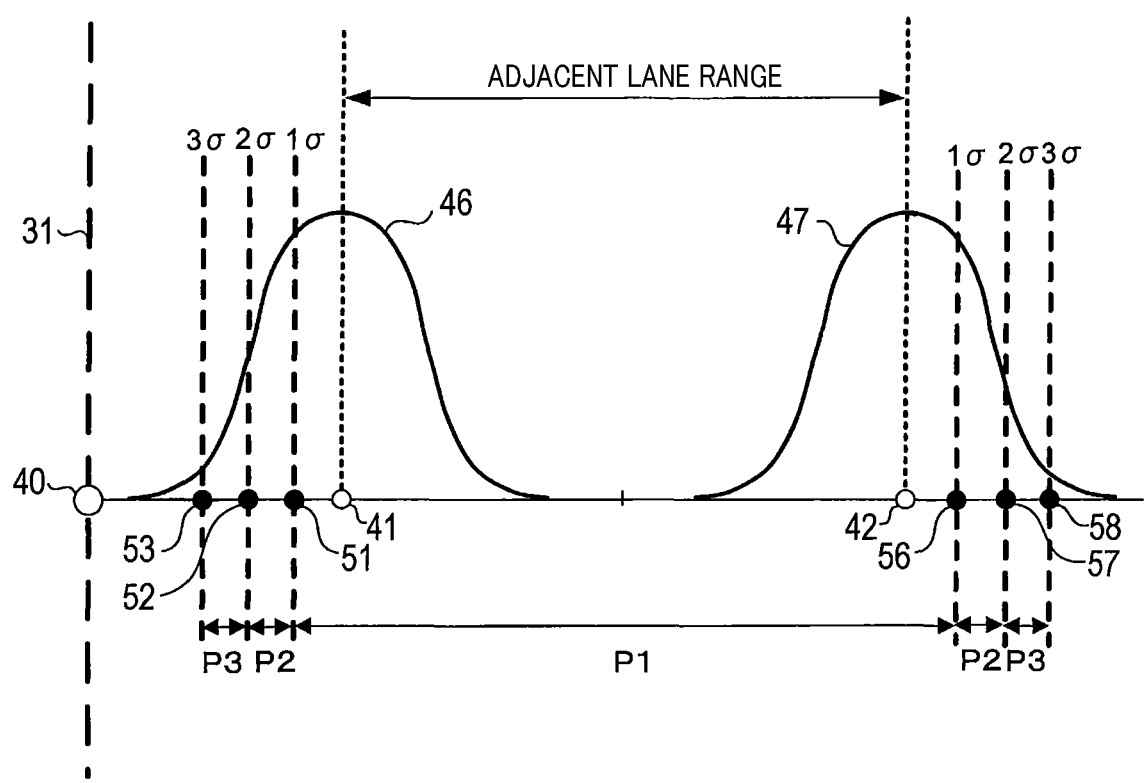
FIG. 8 is a diagram illustrating a method of generating a lane probability map.

At S150, the CPU 11 calculates a lane probability map based on the calculation executed at S140. Specifically, as shown in FIG. 8, the CPU 11 first calculates an inner definition position 41 and an outer definition position 42 as lateral end positions of the adjacent lane in the lane width direction. The inner definition position 41 is a position shifted rightward from the own vehicle estimated position 40 on the own vehicle trajectory 31 by a predetermined distance (e.g., half of the lane width). The outer definition position 42 is a position shifted further rightward from the inner definition position 41 by a distance equal to the lane width. Then, the CPU 11 projects an error variance to each of the inner and outer definition positions 41 and 42, indicative of the estimated presence range determined for the own vehicle estimated position 40. The error variance projected to the inner definition position 41 is hereinafter referred to as an inner probability distribution 46. The error variance projected to the outer definition position 42 is hereinafter referred to as an outer probability distribution 47. Accordingly, a probability distribution is determined for the adjacent lane in terms of the own vehicle estimated positions at the control time points in the N preceding cycles. It should be noted that, in the inner probability distribution 46, an actually significant distribution area is the left side area of the peak (i.e., the inner definition position 41). In the outer probability distribution 47, an actually significant distribution area is the right side area of the peak (i.e., the outer definition position 42). Between the peaks of the probability distributions 46 and 47, that is, between the inner and outer definition positions 41 and 42 corresponds to an adjacent lane range.

A reference sign P1 is taken to be a probability that the adjacent lane is present between positions 51 and 56 corresponding to 1σ in the respective normal distributions of the probability distributions 46 and 47, including the adjacent lane range. A reference sign P2 is taken to be a probability that the adjacent lane is present between positions 52 and 57 corresponding to 2σ that is outside the positions 51 and 56. A reference sign P3 is taken to be a probability that the adjacent lane is present between 53 and 58 corresponding to 3σ that is outside the positions 52 and 57. The relationship between these probabilities is expressed by P1>P2>P3.

Then, a lane probability map is calculated by joining points indicative of equal probabilities in the inner probability distribution 46 and joining points indicative of equal probabilities in the outer probability distribution 47. The lane probability map may be taken to be a map that indicates the probability of the target being present in the adjacent lane is Px if a target is present in an area where the probability of the adjacent lane being present is Px.

Figure 9:
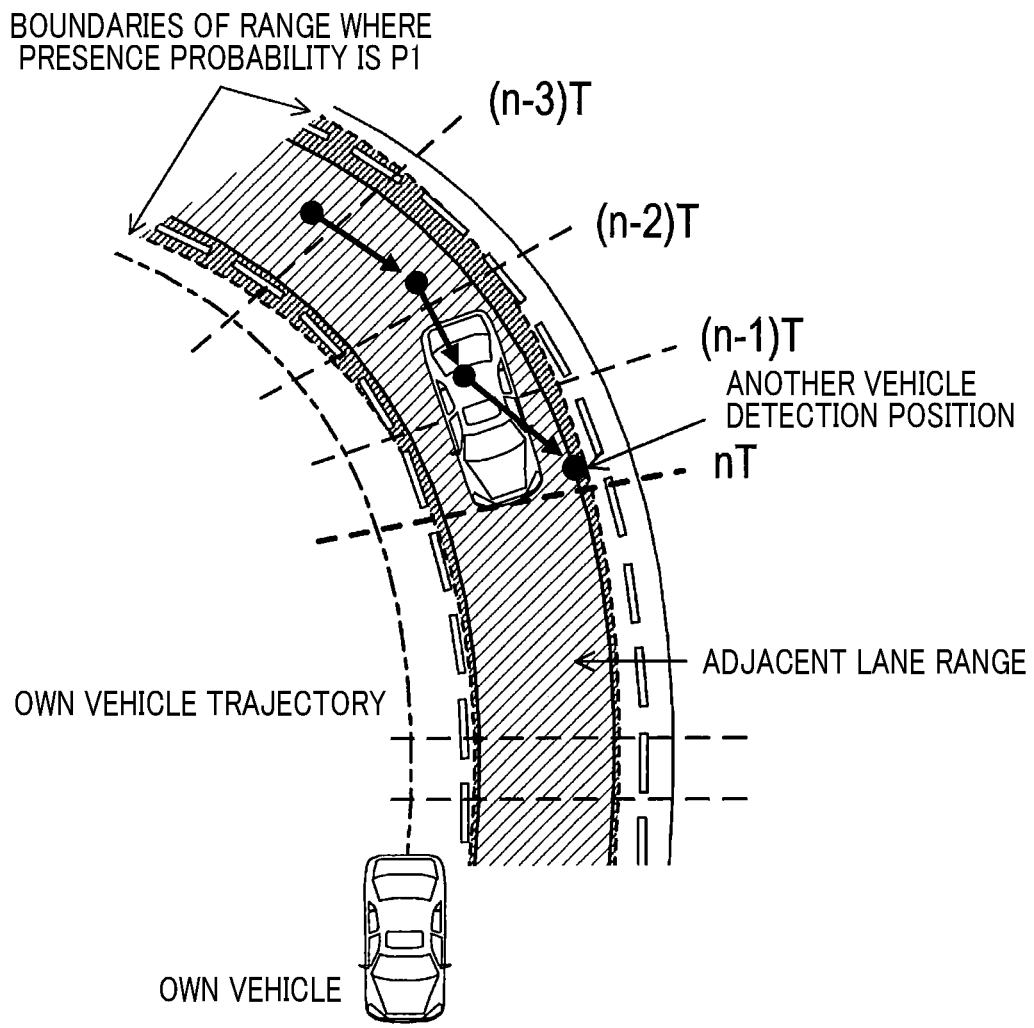
FIG. 9 is a diagram illustrating an image of the lane probability map.

FIG. 9 shows a lane probability map indicating an own vehicle trajectory, an adjacent lane range, and an area with a presence probability of P1. As shown in FIG. 9, the farther from the own vehicle, the wider the range where a presence probability becomes P1.

At S160, the CPU 11 calculates a wall history. Specifically, the CPU 11 calculates a wall history that is a trajectory of wall positions where the wall has been present, based on the positions of the wall obtained at S110 at respective time points in N preceding cycles.

At S170, the CPU 11 calculates a presence probability of a target in the adjacent lane. Specifically, the CPU 11 calculates a presence probability distribution of a target based on the lane probability map calculated at S150 and taking the wall history calculated at S160 into account. That is, basically, the presence probability of a target is calculated according to the lane probability map. However, if a wall is present, then the presence probability of the adjacent lane is taken to be zero for the area outside the wall in the lane probability map. Consequently, the presence probability of a target in the area outside, the wall is taken to be zero At S180, the CPU 11 determines whether a target is present in the adjacent lane. Specifically, the CPU 11 determines whether a target is present in the adjacent lane based on the target presence probability calculated at S170 and the position information of the target detected by the radar device. For example, if a target is present in an area with a target presence probability of 70% or more, the CPU 11 determines that the target is present in the adjacent lane. If a target is present in an area with a target presence probability of less than 70%, the CPU 11 determines that the target is not present in the adjacent lane.

Note that the presence probability used as a determination threshold is not limited to 70% but may be determined so as to ensure reliability of the control that utilizes the determination.

At S190, the CPU 11 extracts an alarm object. Specifically, if it is determined that a target is present in the adjacent lane at S170, the CPU 11 extracts the target as an alarm object if the positional relationship between the target and the own vehicle satisfies a predetermined condition. The predetermined condition may, for example, be that a relative distance, which is a distance between the own vehicle and the target, is equal to or shorter than a predetermined distance, or a decrease rate of the relative distance is equal to or lower than a predetermined decrease rate threshold, i.e., the target is rapidly approaching the own vehicle. Alternatively, the predetermined condition may be that the relative distance is equal to or shorter than the predetermined distance and the decrease rate of the relative distance is equal to or higher than a decrease rate threshold.

At S200, the CPU 11 executes an alarm output process. Specifically, if an alarm object is extracted at S190, the CPU 11 allows the alarm device 4 to output an alarm indicative of the presence of the alarm object.

[2-2. Radius Estimation Process]

Next, referring to FIG. 3, a radius estimation process executed at S130 mentioned above will be described.

When the present process is started, the CPU 11 of the control unit 10 calculates, at S210, a yaw radius Ry that is the turning radius of the own vehicle using Equation (1), based on the yaw rate ω and the vehicle speed Vs among the pieces of odometry information acquired at the previous step S120.

$$Ry = Vs/\omega \qquad (1)$$

At S220, the CPU 11 calculates a rate of change of the yaw radius (hereinafter referred to as a yaw change rate) ΔY using Equation (2) based on the yaw radii calculated at S210 of the present and the previous control cycles. In Equation (2), n is a positive integer indicating the number of control cycles. Ry (n×T) is the yaw radius calculated in the present control cycle. Ry ((n−1)×T) is the yaw radius calculated in the previous control cycle.

$$\Delta Y = |Ry(n \times T) - Ry((n-1) \times T)|/Ry((n-1) \times T) \times 100 \qquad (2)$$

At S230, the CPU 11 determines whether the yaw change rate ΔY is equal to or higher than a preset threshold TH. If the yaw change rate ΔY is lower than the threshold TH (e.g., 50%), control proceeds to S240. If the yaw change rate ΔY is equal to or higher than the threshold TH, control proceeds to S250.

At S240, the yaw radius Ry is set, as it is, as an estimated radius Re and then the present process is terminated.

At S250, the CPU 11 determines an adjustment factor M using the adjustment factor map shown in FIG. 4, based on the yaw change rate ΔY and the vehicle speed Vs. The adjustment factor M refers to a mixing ratio, taking a value of 0 to 1, used for determining an estimated radius Re through weighted summation of a yaw radius Ry and a steering angle radius Rs. M=1 means that 100% of the yaw radius Ry is used. M=0 means that 100% of the steering angle radius Rs is used. Note that the adjustment factor map is set such that the adjustment factor M decreases as the yaw change rate ΔY increases and as the vehicle speed Vs decreases. The adjustment factor map used is prepared in advance based on experiments or the like.

Figure 5:
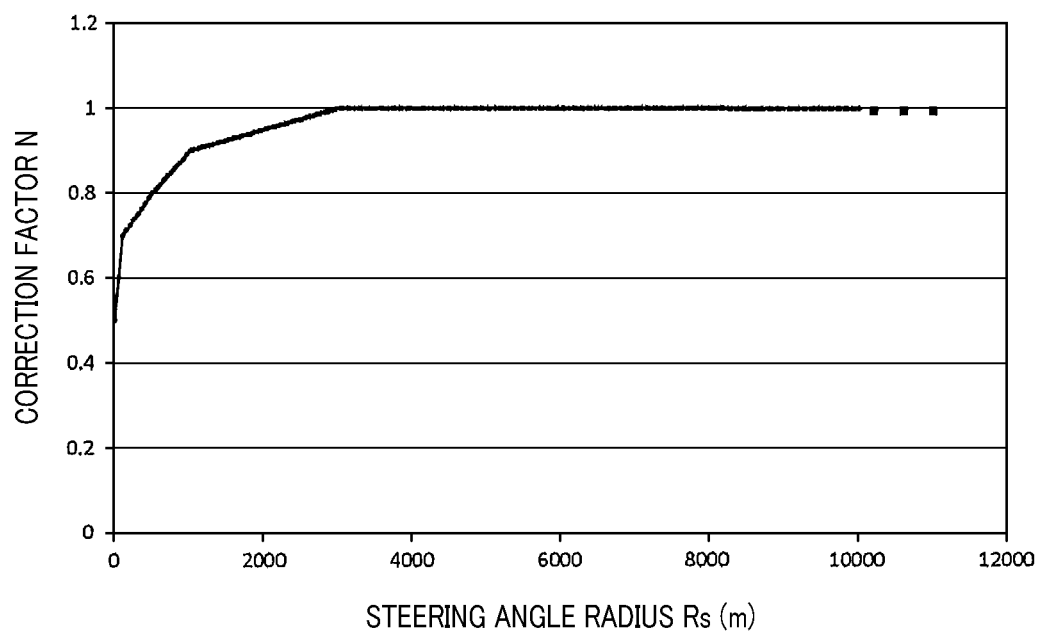
FIG. 5 is a diagram illustrating a correction factor map.

At S260, the CPU 11 sets a correction factor N using the correction factor map shown in FIG. 5, based on the steering angle radius Rs among the pieces of odometry information acquired at S120. The correction factor N, taking a value of 0 to 1, is used for correcting the steering angle radius Rs. N=1 means that the steering angle radius Rs is used as it is. With the correction factor N, the steering angle radius Rs is corrected to a value slightly smaller than a calculated value. Note that the correction factor map is set such that N=1 is established when the steering angle radius Rs is equal to or larger than a given value (e.g., 3000 m) and that, when smaller than the given value, the correction factor N decreases as the steering angle radius Rs decreases. Similarly to the adjustment factor map, the correction factor map used is prepared in advance based on experiments or the like.

At S270, the CPU 11 calculates an estimated radius Re using Equation (3), based on the yaw radius Ry, the steering angle radius Rs, the adjustment factor M determined at S250, and the correction factor N determined at S260.

$$Re = M \times Ry + N \times (1-M) \times Rs \qquad (3)$$

3. Operation Example

Figure 6:
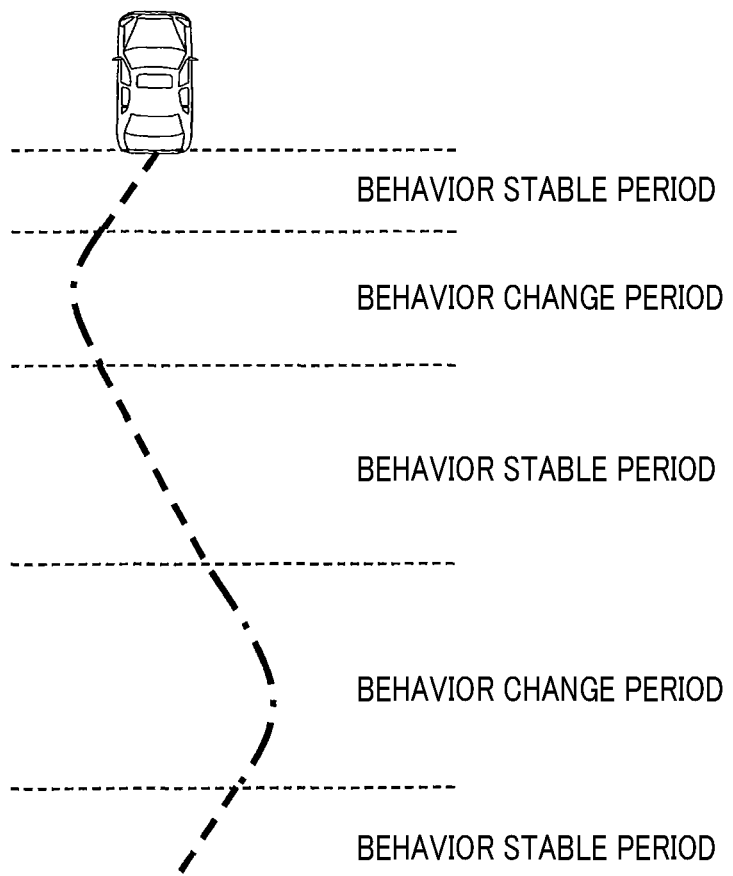
FIG. 6 is a diagram illustrating an example of operation.
Figure 7:
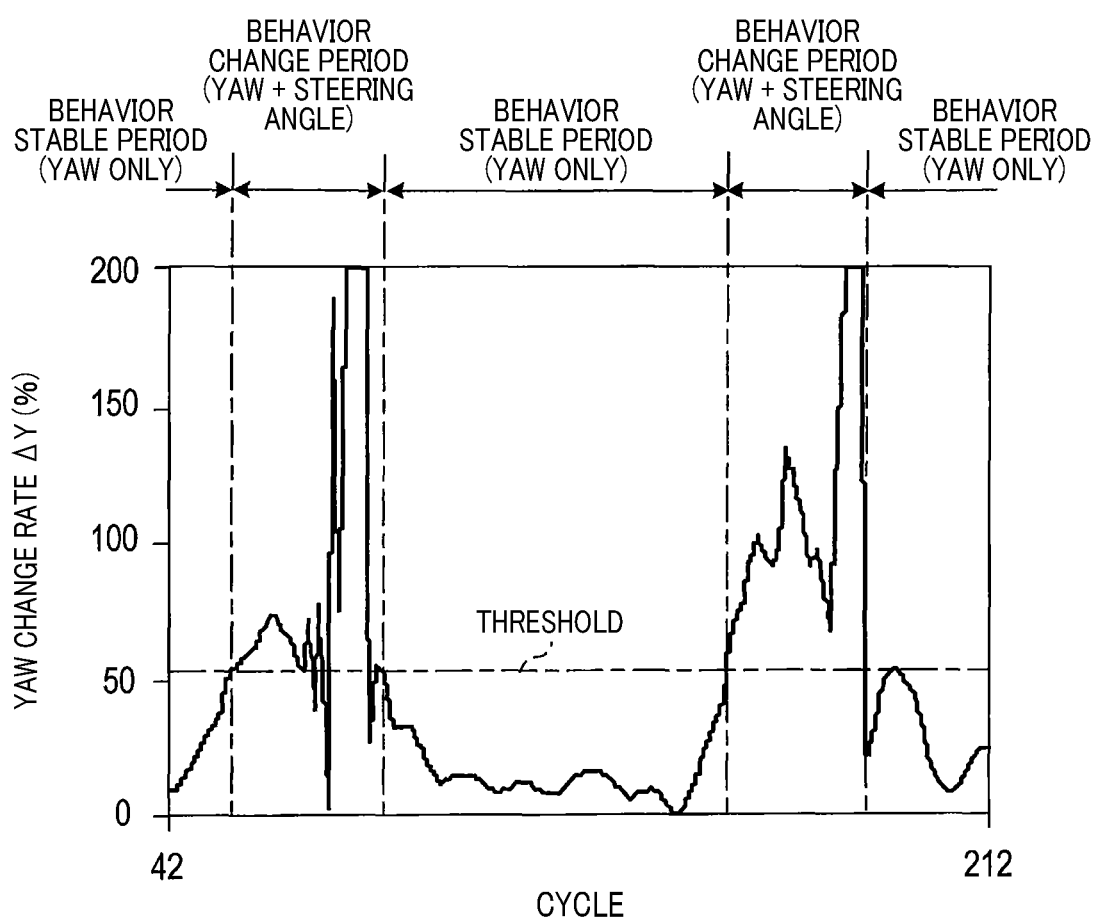
FIG. 7 is a graph illustrating variation in yaw rate in the example of operation.

FIG. 6 shows a situation where the steering wheel is operated to change the straight traveling direction leftward, followed by straight traveling, and then the steering wheel is operated again to change the straight traveling direction rightward, followed by straight traveling. In this case, as shown in FIG. 7, the yaw change rate ΔY detected during the period corresponding to the straight traveling (hereinafter referred to as behavior stable period) is smaller than a threshold. Also, the yaw change rate ΔY detected during the period where the steering wheel is being operated to change the traveling direction (hereinafter referred to as behavior change period) is equal to or larger than the threshold TH.

Thus, the yaw radius Ry is used, as it is, as an estimated radius Re during the behavior stable period. As a result, the own vehicle trajectory is estimated based on the yaw rate co. That is, errors based on poor responsiveness of the detected yaw rate are less likely to be accumulated during the behavior stable period and thus accurate estimation can be achieved mainly based on the yaw rate having good accuracy. On the other hand, a value obtained through weighted summation of the yaw radius Ry during the behavior change period and the steering angle radius Rs is used as an estimated radius Re. As a result, the own vehicle trajectory is estimated based on the yaw rate ω corrected by the steering angle θ. That is, since the accumulation of errors based on poor responsiveness of the detected yaw rate is not negligible during the behavior change period, use of the yaw rate corrected by the steering angle having good responsiveness can minimize the adverse effect of the errors.

4. Experiments

Figure 10:
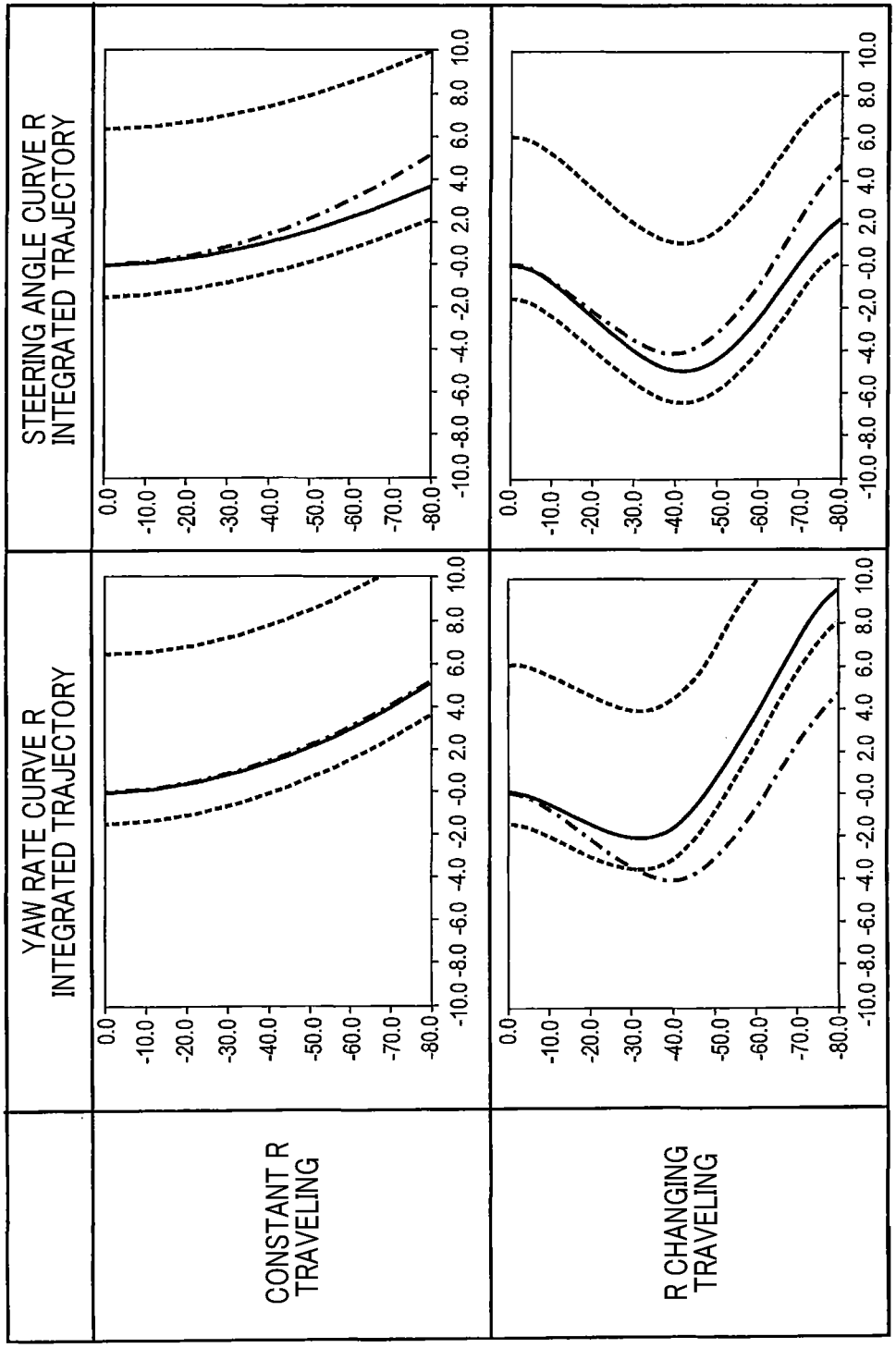
FIG. 10 is a set of graphs illustrating an accuracy of traveling path calculated from a yaw radius and a steering angle radius.

FIG. 10 is a set of diagrams illustrating own vehicle trajectories in a situation where the own vehicle travels on a road with a constant curvature radius (hereinafter referred to as a constant R traveling) as an example of the behavior stable period, and in a situation where the own vehicle travels on an S-shaped road (hereinafter referred to as an R changing traveling) as an example of the behavior change period. An own vehicle trajectory is obtained by measuring a yaw radius Ry and a steering angle radius Rs and integrating these measurement values. As shown in FIG. 10, during the constant R traveling, the own vehicle trajectory based on the yaw radius Ry basically has no errors, whereas the own vehicle trajectory based on the steering angle radius Rs shows increase in the number of errors over time. Further, during the R changing traveling, the own vehicle trajectory based on the steering angle radius Rs shows smaller errors than the own vehicle trajectory based on the yaw radius Ry.

Figure 11:
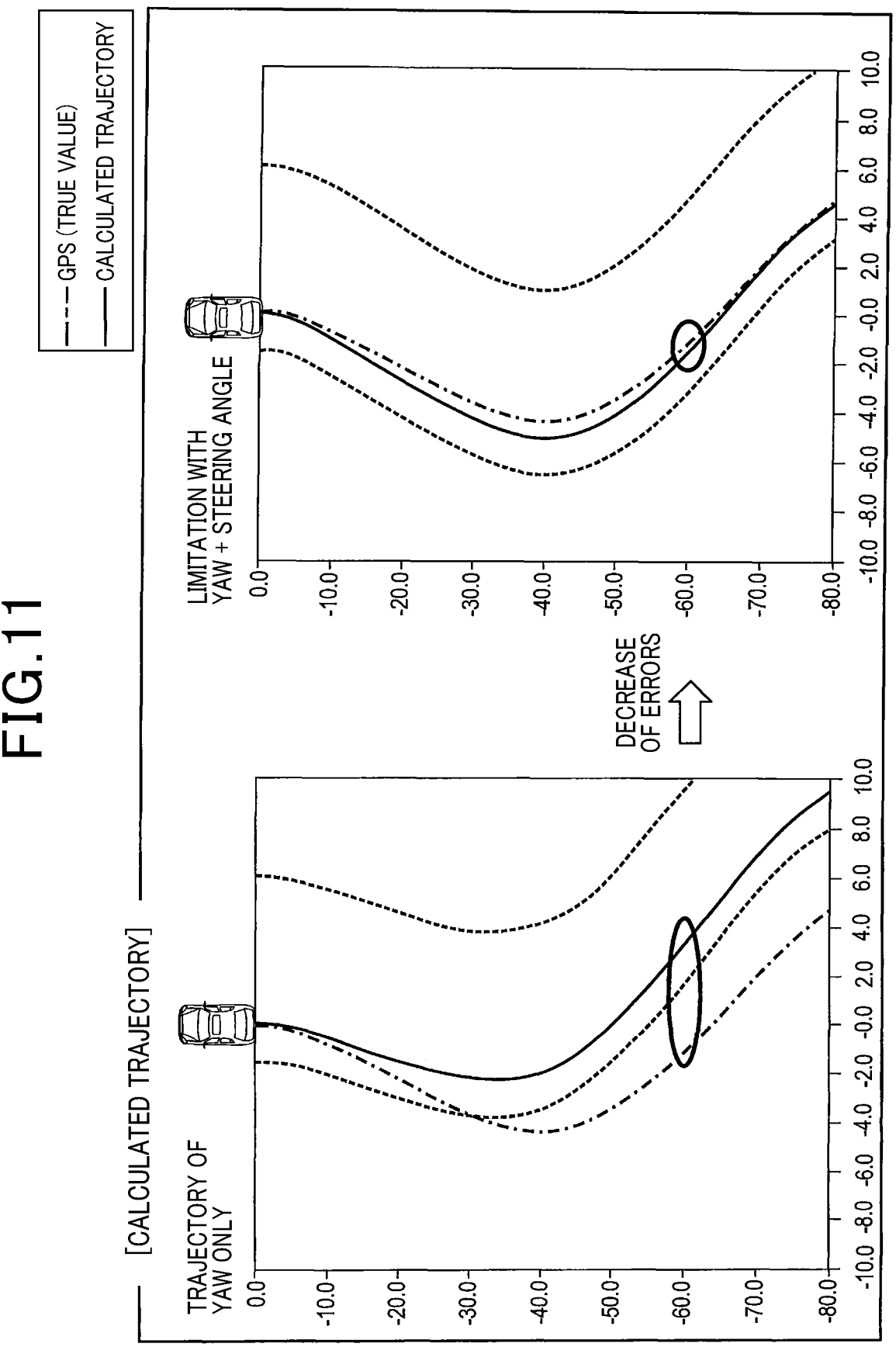
FIG. 11 is a set of graphs illustrating the accuracy of traveling path calculated from an estimated radius which is based on the technique of the embodiment and based on a comparative technique using a yaw radius.

FIG. 11 shows a set of diagrams illustrating an own vehicle trajectory obtained through a comparative technique using only the yaw radius Ry, and an own vehicle trajectory obtained through a disclosed technique using a combination of the yaw radius Ry and the steering angle radius Rs depending on the situation, as applied to the on-vehicle system 1. These own vehicle trajectories have been obtained based on the measurements of the yaw radius Ry and the steering angle radius Rs during the R changing traveling. As shown in FIG. 11, comparing these own vehicle trajectories, errors are significantly reduced in the disclosed technique compared to the comparative technique. In FIGS. 10 and 11, the trajectories indicated by solid lines are the calculated own vehicle trajectories, the trajectories indicated by dash-dot lines are the actual trajectories derived, from a GPS, and the trajectories indicated by dotted lines are boundaries of recognized areas determined based on the respective own vehicle trajectories. It should be noted that the recognized area herein refers to an area that is a combination of the own vehicle lane and the adjacent lane located on the right of the own vehicle lane.

5. Advantageous Effects

According to the embodiment specifically described above, the following advantageous effects can be obtained.

(1) The on-vehicle system 1 uses the yaw change rate $\Delta Y$ to determine whether the current period is the behavior stable period or the behavior changing period. In the behavior stable period, the yaw radius Ry is used, as it is, as an estimated radius Re. On the other hand, in the behavior changing period, the estimated radius Re used is obtained through weighted summation of the yaw radius Ry and the steering angle radius Rs using a weight that depends on the situation. That is, since the output from the yaw rate sensor having good accuracy is mainly used in the behavior stable period, the estimated radius Re and the own vehicle trajectory can be accurately obtained. On the other hand, since the output from the yaw rate sensor is corrected by the output from the well-responsive steering angle sensor in the behavior change period, errors are minimized, which are included in the estimated radius Re or the own vehicle trajectory based on the poor-responsive yaw rate sensor.

(2) The on-vehicle system 1 calculates the probability of the adjacent lane being present based on the own vehicle trajectory, and thus the improvement in the accuracy of the own vehicle trajectory can narrow the probability distribution of the adjacent lane. Narrowing of the probability distribution leads to improvement in the determination accuracy for the presence of a target in the adjacent lane that is located at a distance from the own vehicle, and in the accuracy of various control operations based on the determination. In other words, narrowing of the probability distribution leads to minimizing erroneous operation of control that would occur based on an erroneous determination, including, for example, an erroneous alarm or erroneous braking that would occur based on an erroneous determination for the lane where the following vehicle is traveling.

(3) The on-vehicle system 1 uses the yaw change rate $\Delta Y$ to determine whether the current period is the behavior stable period or the behavior changing period. Therefore, possible deterioration in the accuracy of the estimated radius Re or the own vehicle trajectory can be minimized even in a situation where a high yaw rate is detected (e.g., at the time of sudden braking or during traveling on an uneven road surface) in the absence of a steering wheel operation (i.e., the vehicle is traveling straight).

6. Other Embodiments

The embodiment of the present disclosure has been described. However, the present disclosure may be variously modified without being limited to the embodiment described above.

(A) In the above embodiment, a rate of change in the yaw radius Ry is used as the yaw change rate $\Delta Y$. However, the present disclosure is not limited to this. For example, a rate of change in the yaw rate $\omega$ may be used instead of the rate of change in the yaw radius Ry.

(B) The above embodiment has been described by way of an example where the own vehicle trajectory detected using the estimated radius Re is applied to the control for providing an alarm by detecting an adjacent vehicle that travels in the adjacent lane. However, the present disclosure is not limited to this. For example, the own vehicle trajectory may be applied to various systems, such as a lane departure-alarm system and a lane keeping system, which enhance safety in traveling, or to an automatic driving control system and the like.

(C) The above embodiment is configured such that the radar system 3 only performs target recognition and outputs all pieces of the target information to the driving support ECU 2, and the driving support EC 2 then makes an alarm determination. However, the present disclosure is not limited to this. For example, the radar system 3 may also make an alarm determination, i.e., processing at S120 to S190, and output the determination to the driving support ECU 2, together with only part of the target information needed for various applications executed by the ECU 2.

(D) A plurality of functions of one component of the above embodiment may be implemented by a plurality of components, or one function of one component may be implemented by a plurality of components. Alternatively, a plurality of functions of a plurality of components may be implemented by one component, or one function implemented by a plurality of components may be implemented by one component. Furthermore, part of the configuration of the above embodiment may be omitted. Additionally, at least part of the configuration of the above embodiment may be added to or replaced with another configuration of the above embodiment. The embodiment of the present disclosure should encompass all the modes included in the technical idea specified only by the wording of the claims.

(E) Besides the on-vehicle system described above, the present disclosure may be implemented in various modes including a turning radius estimating apparatus, a travel trajectory estimating apparatus, or systems including these apparatuses as components, a program allowing a computer to function as the turning radius estimating apparatus or the travel trajectory estimating apparatus, a non-transitory tangible recording medium such as a semiconductor memory in which the program is recorded, a turning radius estimating method, and a travel trajectory estimating method.

The invention claimed is:

1. An estimating apparatus mounted on a vehicle to estimate a turning radius of the vehicle based on a steering angle and a yaw rate of the vehicle, the estimating apparatus comprising:
   a processor;
   a non-transitory computer-readable storage medium; and
   a set of computer-executable instructions stored on the non-transitory computer-readable storage medium that cause the processor to:
      acquire odometry information including the yaw rate of the vehicle and the steering angle of the vehicle;
      calculate an estimated turning radius of the vehicle based on a contribution of the steering angle and a contribution of the yaw rate;
      calculate a yaw change rate representing a degree of change in the yaw rate;
      determine a positional relationship between an object and the vehicle based on the estimated turning radius of the vehicle; and
      output an alarm that indicates a presence of the object for a state in which the positional relationship between the object and the vehicle satisfies a predetermined condition, wherein
   the contribution of the yaw rate decreases and the contribution of the steering angle increases as the yaw change rate increases.

2. The estimating apparatus according to claim 1, wherein the set of computer-executable instructions further cause the processor to:
   set the contribution of the yaw rate to 100% in response to the yaw change rate being lower than a preset threshold.

3. The estimating apparatus according to claim 1, wherein the odometry information acquired includes a vehicle speed that is a speed of the vehicle; and
   decrease the contribution of the yaw rate decreases and the contribution of the steering angle decreases as the vehicle speed decreases.

4. The estimating apparatus according to claim 1, wherein the contribution of the steering angle decreases as the steering angle increases.

5. The estimating apparatus according to claim 1, wherein the set of computer-executable instructions further cause the processor to:
   calculate the estimated turning radius based on a weighted summation of a yaw radius and a steering angle radius, the yaw radius being a turning radius calculated from the yaw rate, the steering angle radius being a turning radius calculated from the steering angle; and
   adjust the contribution of the yaw rate by increasing or decreasing a weight of the weighted summation.

6. The estimating apparatus according to claim 1, wherein the set of computer-executable instructions further cause the processor to:
   calculate a travel trajectory of the vehicle based on the estimated turning radius.

7. The estimating apparatus according to claim 6, wherein the travel trajectory is utilized by at least one of a lane departure alarm system, a lane keeping system and an automatic driving control system.

8. The estimating apparatus according to claim 1, wherein the estimated turning radius is utilized by at least one of a lane departure alarm system, a lane keeping system and an automatic driving control system.

9. The estimating apparatus according to claim 1, wherein the predetermined condition is satisfied based on comparing at least one of:
   (i) a relative distance between the vehicle and the object to a predetermined distance threshold; and
   (ii) a rate of change of the relative distance between the vehicle and the object to a predetermined rate of change threshold.

10. A computer-implemented method for calculating an estimated turning radius of a vehicle based on a steering angle and a yaw rate of the vehicle, in which the estimated turning radius is used to calculate a travel trajectory of the vehicle, the method comprising:
    acquiring odometry information of the vehicle including the yaw rate and the steering angle of the vehicle;
    calculating an estimated turning radius of the vehicle based on a contribution of the steering angle and a contribution of the yaw rate;
    calculating a yaw change rate representing a degree of change in the yaw rate;
    determining a positional relationship between an object and the vehicle based on the estimated turning radius of the vehicle; and
    outputting an alarm that indicates a presence of the object for a state in which the positional relationship between the object and the vehicle satisfies a predetermined condition, wherein
    the contribution of the yaw rate decreases and the contribution of the steering angle increases as the yaw change rate increases.

11. The computer-implemented method according to claim 10, further comprising:
    calculating a travel trajectory of the vehicle based on the estimated turning radius.

12. The computer-implemented method according to claim 11, wherein
    the travel trajectory is utilized by at least one of a lane departure alarm system, a lane keeping system and an automatic driving control system.

13. The computer-implemented method according to claim 10, wherein
    the estimated turning radius is utilized at least one of a lane departure alarm system, a lane keeping system and an automatic driving control system.

14. The computer-implemented method according to claim 10, wherein the predetermined condition is satisfied based on comparing at least one of:
    (i) a relative distance between the vehicle and the object to a predetermined distance threshold; and
    (ii) a rate of change of the relative distance between the vehicle and the object to a predetermined rate of change threshold.

* * * * *